US006789651B2

(12) United States Patent
Ogura et al.

(10) Patent No.: US 6,789,651 B2
(45) Date of Patent: Sep. 14, 2004

(54) DAMPING DEVICE (75) Inventors: Katsuyuki Ogura, Utsunomiya (JP); Koji Takesako, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 96 days.

(21) Appl. No.: 10/099,991

(22) Filed: Mar. 19, 2002

(65) Prior Publication Data
US 2003/0006109 A1 Jan. 9, 2003

(30) Foreign Application Priority Data

Mar. 29, 2001 (JP) ........................................ 2001-096403

(51) Int. Cl.[7] ................................................. F16F 9/53
(52) U.S. Cl. ........................ 188/267.1; 384/9; 74/574
(58) Field of Search ............................... 188/267.1, 290, 188/293, 378–380; 248/562, 566, 581, 637, 638; 384/9, 40, 45, 57, 99; 74/572, 574

(56) References Cited

U.S. PATENT DOCUMENTS

| 5,462,361 A | 10/1995 | Sato et al. |
| 5,678,460 A | 10/1997 | Walkowc |
| 5,719,481 A | 2/1998 | Mo |
| 5,944,152 A | 8/1999 | Lindsay et al. |
| 6,116,784 A | * 9/2000 | Brotz ........................... 384/99 |
| 6,123,312 A | * 9/2000 | Dai ............................. 248/550 |

FOREIGN PATENT DOCUMENTS

| JP | A 1-288612 | 11/1989 |
| JP | A 6-146654 | 5/1994 |
| WO | WO 99/06731 | 2/1999 |
| WO | WO 00/53937 | 9/2000 |

* cited by examiner

Primary Examiner—Pam Rodriguez
(74) Attorney, Agent, or Firm—Oliff & Berridge, PLC (57) ABSTRACT This invention is intended to provide a damping device capable of conducting highly precise damping control. To attain this object, this invention is a damping device used in a machine which includes a rotating object and a motor rotating the rotating object, wherein the damping device includes: a vibration damper filled with an electroviscous fluid having a viscosity changing according to a value of a voltage applied to the electroviscous fluid, and rotatably supporting at least a part of the rotating object in the electroviscous fluid; a voltage applicator applying the voltage to the electroviscous fluid in the vibration damper; and a controller controlling an operation of the voltage applicator so that an optimum voltage, at which the viscosity of the electroviscous fluid absorbing a vibration of the rotating object most effectively is obtained, can be applied to the electroviscous fluid in the vibration damper in accordance with a rotating speed of the rotating object.

11 Claims, 4 Drawing Sheets

DAMPING DEVICE

RELATED APPLICATIONS

This application claims the priority of Japanese Patent Application No. 2001-96403 filed on Mar. 29, 2001, which is incorporated herein.

BACKGROUND OF THE INVENTION

1. Field of the Invention

The present invention relates to a damping device. More specifically, the present invention relates to the improvement of the control mechanism of a vibration damping device which uses an electroviscous fluid.

2. Description of the Prior Art

Conventionally, a feeding device which scans a sample in, for example, XYZ directions is employed in a machine such as a coordinate measuring machine, e.g., a three-dimensional coordinate measuring machine, a machine tool or a positioning device. This feeding device allows a supporting column, on which a probe, a tool or the like are provided, to make a feed motion relative to a base, on which normally a sample is mounted, or allows the base to make a feed motion relative to the supporting column, thereby scanning a sample surface.

This feeding device, which is rotatably supported by, for example, the base, includes a rotating object having a male thread provided on a peripheral portion, a nut provided with a female thread fitted into the male thread and the like and fixes the supporting column to the nut. When the rotating object is rotated, the rotating force thereof is transformed into the linear motion of the nut by the male and female threads, whereby the feeding device scans the sample in, for example, a horizontal direction with the supporting column on which the nut is provided set as a base. The use of such a feeding device enables, for example, a three-dimensional coordinate measuring machine to make point-to-point measurement and scanning measurement.

In recent years, much attention has been paid to the scanning measurement of a measuring machine can acquire measurement data in large quantities rather than an improvement in measurement precision. A high speed scanning measuring technique which can shorten measurement time is particularly noted.

However, according to the above-stated feeding device, When the rotating object is rotated, a vibration occurs to the body. While the body is moved at high speed, particularly accelerated and decelerated at, for example, the horizontal position between the base and the supporting column, a hard vibration occurs. In addition, during low speed movement such as during measurement, a micro-vibration different from the vibration during the high speed movement occurs.

These vibrations make it impossible for a machine which employs the feeding device to conduct more precise positioning. Further, these vibrations make it impossible for a measuring machine to make a measurement at a desired measuring point and for a probe to pick up vibrations, thereby obstructing more precise measurement.

In this background, a precision measuring machine such as a three-dimensional coordinate measuring machine is required to be driven at higher speed with weaker vibrations than before.

As a conventional damping method, it has been proposed to provide a damping target relative to a base through a spring. It has been also proposed to add dry friction and viscosity resistance; however all the damping attained thereby acts as traveling load during high speed movement, disadvantageously causing hysteresis.

Furthermore, a method of providing, for example, rubber resin on the connection section between rotation shafts and thereby decreasing the propagation of vibrations has been conventionally proposed. However, if the rubber resin is provided, torsional rigidity deteriorates, which sometimes makes it impossible to surely transmit high torque. As a result, this poses a serious problem in relation to control particularly in the high speed scanning measurement.

Moreover, a residual vibration during high speed movement differs in state from that of during low speed movement. In addition, in case of a measuring machine or the like, a vibration state during point-to-point measurement differs from that of during scanning measurement. Further, a conventional damping device is set to damp a specific vibration state. Due to this, even if there occurs a different vibration state, the conventional damping device is incapable of effectively damping the different vibration state at, for example, a different speed. As a result, it has been conventionally difficult to effectively damp vibrations at varied speeds using a single damping device.

Meanwhile, there has been proposed the following technique (see, for example, Japanese Patent Unexamined Application Publication No. 6-146654 and 1-288612). A feeding device employed in an ordinary mechanical damping device uses an electroviscous fluid in a vibration damper and has a rotation shaft which is rotatably supported in the electroviscous fluid. A voltage to be applied to the electroviscous fluid is changed and the viscosity of the electroviscous fluid is changed, thereby damping a vibration according to each vibration state.

While the damping device using the electroviscous fluid of this type is employed for an ordinary machine, it is also expected to be adapted to a precision machine.

Nevertheless, even with the ordinary mechanical damping device, an electroviscous fluid control method has not been concretely established yet. To apply this method to a precision machine which requires a more precise feed motion and higher speed, it leaves much room for improvement in the high precision and high speed of control.

SUMMARY OF THE INVENTION

The present invention has been achieved in view of the conventional problems described above. It is the first object of the present invention to provide a damping device capable of conducting more precise vibration control.

To attain the first object, a damping device according to the present invention is a damping device used in a machine which includes a rotating object rotating about a rotation axis and a motor rotating the rotating object, and characterized by including a vibration damper, a voltage applicator, and a controller.

The vibration damper is filled with an electroviscous fluid having a viscosity changing according to a value of a voltage applied to the electroviscous fluid, and rotatably supports at least a part of the rotating object in the electroviscous fluid.

The voltage applicator applies the voltage to the electroviscous fluid in the vibration damper.

The controller controls an operation of the voltage applicator so that an optimum voltage, at which the viscosity of the electroviscous fluid absorbing a vibration of the rotating object most effectively is obtained, can be applied to the electroviscous fluid in the vibration damper in accordance with a rotating speed of the rotating object.

According to the present invention, the rotating object includes a damping rotation shaft, a driving rotation shaft, and a coupling. In addition, it is preferable that a rotating force from the driving rotation shaft is surely transmitted to the damping rotation shaft through the coupling, and the coupling absorbs misalignment between the damping rotation shaft and the driving rotation shaft.

The damping rotation shaft is supported in the electroviscous fluid in the vibration damper.

The driving rotation shaft transmits a driving force from the motor.

The coupling connects the damping rotation shaft to the driving rotation shaft.

"A rotating force from the driving rotation shaft is surely transmitted to the damping rotation shaft through the coupling" indicates that the coupling is made of, for example, a material having high torsional rigidity. The coupling suitably employed in this invention is a coupling which has high torsional rigidity and which can absorb the misalignment between the rotation shafts such as a metal spring type coupling having a metal spring intervened to connect the rotation shafts. This metal spring type coupling is exemplified by a metal coil spring type coupling, a metal plate spring type coupling or the like.

Further, it is the second object of the present invention to provide a damping device capable of conducting vibration control more promptly.

To attain the second object, according to the present invention, the damping device includes an indicator and a memory. In addition, when the indicator indicates the rotating speed of the rotating object, the controller indicates the motor to rotate the rotating object at the indicated rotating speed. Preferably, simultaneously with the indicator, the controller selects the optimum voltage applied to the electroviscous fluid to correspond to the indicated rotating speed and controls the operation of the voltage applicator so that the selected voltage can be applied to the electroviscous fluid in the vibration damper.

The indicator indicates the rotating speed of the rotating object.

The memory stores control information representing a relationship between the rotating speed of the rotating object and the optimum voltage applied to the electroviscous fluid at which the viscosity of the electroviscous fluid absorbing the vibration of the rotating object most effectively at the rotating speed, obtained in advance, for each expected rotating speed of the rotating object.

Further, according to the present invention, the controller preferably selects, from the control information in the memory, the voltage applied to the electroviscous fluid at which the viscosity of the electroviscous fluid in the vibration damper becomes lower as an indicated value of the rotating speed of the rotating object indicated by the indicator becomes higher. On the other hand, the controller preferably selects, from the control information in the memory, the voltage applied to the electroviscous fluid at which the viscosity of the electroviscous fluid in the vibration damper becomes higher as the indicated value of the rotating speed of the rotating object indicated by the indicator becomes lower.

Moreover, according to the present invention, the damping device includes a detector. In addition, it is preferable that the controller selects the optimum voltage applied to the electroviscous fluid to correspond to the rotating speed detected by the detector from the control information in the memory, and actively controls the operation of the voltage applicator so that the selected voltage can be applied to the electroviscous fluid.

The detector detects the rotating speed of the rotating object at real time.

Additionally, according to the present invention, the controller preferably selects the voltage applied to the electroviscous fluid at which the viscosity of the electroviscous fluid in the vibration damper becomes lower as the speed value of the rotating object detected by the detector becomes higher. On the other hand, the controller preferably selects the voltage applied to the electroviscous fluid at which the viscosity of the electroviscous fluid in the vibration damper becomes higher as the speed value of the rotating object detected by the detector becomes lower. It is also preferable that the controller actively controls the operation of the voltage applicator in accordance with the rotating speed detected by the detector.

In addition, to attain the first object, a damping device according to the present invention is a damping device used in a feeding device which includes a rotating object having a male thread formed thereon and rotating about a rotation axis, a motor rotating the rotating object, and a movable object making a linear motion, and characterized by including a vibration damper, a voltage applicator, and a controller.

The vibration damper is provided with a female thread fitted into the male thread of the rotating object and transforming a rotating motion of the rotating object into the linear motion. In addition, the vibration damper is filled with an electroviscous fluid having a viscosity changing in accordance with a value of a voltage applied to the electroviscous fluid, and movably supports at least a part of the movable object in the electroviscous fluid.

The voltage applicator applies the voltage to the electroviscous fluid in the vibration damper.

The controller controls an operation of the voltage applicator so that an optimum voltage, at which the viscosity of the electroviscous fluid absorbing a vibration of the movable object most effectively is obtained, can be applied to the electroviscous fluid in the vibration damper in accordance with a moving speed of the movable object.

To attain the second object, according to the present invention, the damping device includes an indicator and a memory. In addition, it is preferable that when the indicator indicates the moving speed of the movable object, the controller indicates the motor to move the movable object at the indicated moving speed, selects the optimum voltage applied to the electroviscous fluid to correspond to the indicated moving speed and controls the operation of the voltage applicator so that the selected voltage can be applied to the electroviscous fluid in the vibration damper.

The indicator indicates the moving speed of the movable object.

The memory stores control information obtained in advance representing a relationship between the moving speed of the movable object and the optimum voltage applied to the electroviscous fluid at which the viscosity of the electroviscous fluid absorbing the vibration of the movable object most effectively at the moving speed, for each expected moving speed of the movable object.

Furthermore, according to the present invention, the controller preferably selects, from the control information in the memory, the voltage applied to the electroviscous fluid at which the viscosity of the electroviscous fluid in the vibration damper becomes higher as an indicated value of the moving speed of the movable object indicated by the indicator becomes higher. On the other hand, the controller preferably selects, from the control information in the memory, the voltage applied to the electroviscous fluid at which the viscosity of the electroviscous fluid in the vibration damper becomes lower as the indicated value of the moving speed of the movable object indicated by the indicator becomes lower.

Moreover, according to the present invention, the damping device includes a detector. In addition, it is preferable that the controller selects the optimum voltage applied to the electroviscous fluid to correspond to the moving speed detected by the detector from the control information in the memory, and actively controls the operation of the voltage applicator so that the selected voltage can be applied to the electroviscous fluid.

The detector detects the moving speed of the movable object at real time.

Additionally, according to the present invention, the controller preferably selects the voltage applied to the electroviscous fluid at which the viscosity of the electroviscous fluid in the vibration damper becomes higher as the speed value of the movable object detected by the detector becomes higher. On the other hand, the controller preferably selects the voltage applied to the electroviscous fluid at which the viscosity of the electroviscous fluid in the vibration damper becomes lower as the speed value of the movable object detected by the detector becomes lower. It is also preferable that the controller actively controls the operation of the voltage applicator in accordance with the moving speed detected by the detector.

DETAILED DESCRIPTION OF THE PREFERRED EMBODIMENT

First Embodiment

A preferred embodiment of the present invention will be described hereinafter with reference to the drawings. It is noted that a ball screw, as an example, is employed to drive a three-dimensional coordinate measuring machine by way of example in this embodiment. Namely, this embodiment assumes a case in which a damping device is provided on the end of a rotation shaft which drives the three-dimensional coordinate measuring machine and the damping device damps vibrations occurred when the rotation shaft rotates.

Figure 1:
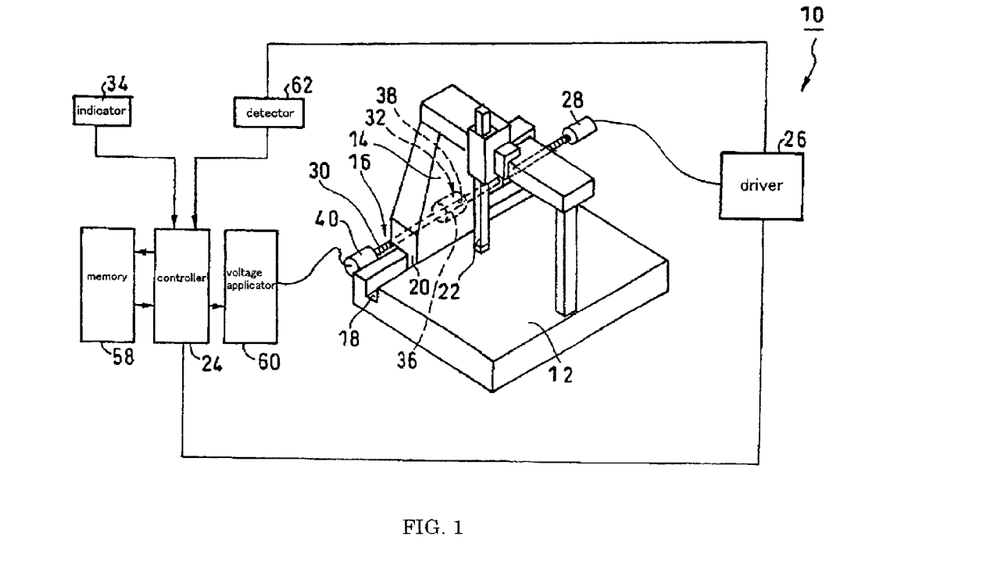
FIG. 1 is an explanatory view for the schematic configuration of a three-dimensional coordinate measuring machine which is provided with a damping device according to the first embodiment of the present invention.

FIG. 1 shows the schematic configuration of the three-dimensional coordinate measuring machine provided with a damping device according to one embodiment of the present invention.

As shown in FIG. 1, the three-dimensional coordinate measuring machine (machine) 10 includes a base 12 on which a sample (not shown), for example, is mounted, a supporting column (linear movable object) 14 and a feeding device 16.

The base 12 has a guide way 18 provided in a linear direction thereof. The slider 20 of the supporting column 14 is fitted into the guide way 18 to slide the slider 20 along the guide way 18. In addition, the supporting column 14 is provided with a probe 22 to obtain sample information such as the positional coordinates of the sample.

The feeding device 16 consists of a controller 24 for damping the vibration of a rotating object, a driver 26, a motor 28, a rotation shaft for driving (rotating object) 30, a nut (linear movable object) 32 and an indicator 34.

The motor 28 consists of, for example, a pulse motor such as a stepping motor. The rotation shaft of the motor 28 is connected to the driving rotation shaft 30. In response to an instruction from the controller 24, the driver 26 rotates the motor 28 to thereby rotate the driving rotation shaft 30.

The driving rotation shaft 30 has a male thread 36 provided on a peripheral surface thereof. The nut 32 has a female thread 38 provided on an inner peripheral surface thereof to be fitted into the male thread 36. For this reason, the rotational motion of the rotation shaft 30 is transformed into the linear motion of the nut 32 through the male thread 36 and the female thread 38. The nut 32 is fixed to the supporting column 14 on an outer peripheral surface thereof.

By thus constituting the three-dimensional coordinate measuring machine 10, when a speed value is input from the indicator 34, an instruction from the controller 24 is transmitted to the driver 26 and the driver 26 thereby rotates the motor 28. When the motor 28 rotates, the driving force of the motor 28 is transmitted to the driving rotation shaft 30 to thereby rotate the driving rotation shaft 30. The rotational motion of the driving rotation shaft 30 is transmitted to the nut 32 through the male thread 36 and the female thread 38, thereby allowing the nut 32 to make a linear motion. Since the supporting column 14 is fixed to the nut 32, it is possible to allow the supporting column 14 and the probe 22 to make feed motions in a horizontal direction to the base 12.

In this embodiment, it is possible to adjust the speed value indicated by the indicator 34 and to adjust driving power applied to the motor 28. It is, therefore, possible to move the supporting column 14 and the probe 22 at high speed during a feed motion for positioning the probe 22 relative to, for example, the sample. In this embodiment, it is also possible to move the supporting column 14 and the probe 22 at low speed or the like when the probe 22 acquires the sample information. In this embodiment, therefore, it is possible to move and feed the supporting column 14 and the probe 22 in accordance with each speed during various measurements such as point-to-point measurement, scanning measurement and high speed scanning measurement and the feed motion.

Figure 2:
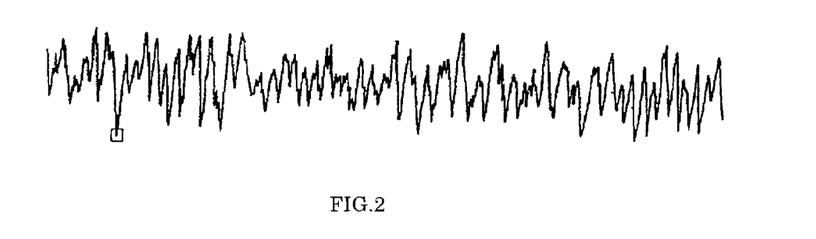
FIG. 2 shows one example of a micro-vibration which is occurred when the three-dimensional coordinate measuring machine is actuated at low speed.

Meanwhile, the occurrence of a residual vibration during acceleration and deceleration is a more serious problem than a micro-vibration during driving at constant speed for, in particular, the movable section of the measuring device such as the three-dimensional coordinate measuring machine. In addition, even if the movable section makes a slight motion, a micro-vibration as shown in FIG. 2, for example, occurs and a variation error often occurs, accordingly. Furthermore, a vibration is occurred even in the high speed scanning measurement.

In this embodiment, therefore, a vibration damper 40 for the rotating object is provided on the opposite end to that of the driving rotation shaft 30 connected to the rotation shaft of the motor 28.

The rotating object vibration damper 40 in this embodiment will be described more concretely.

Figure 3:
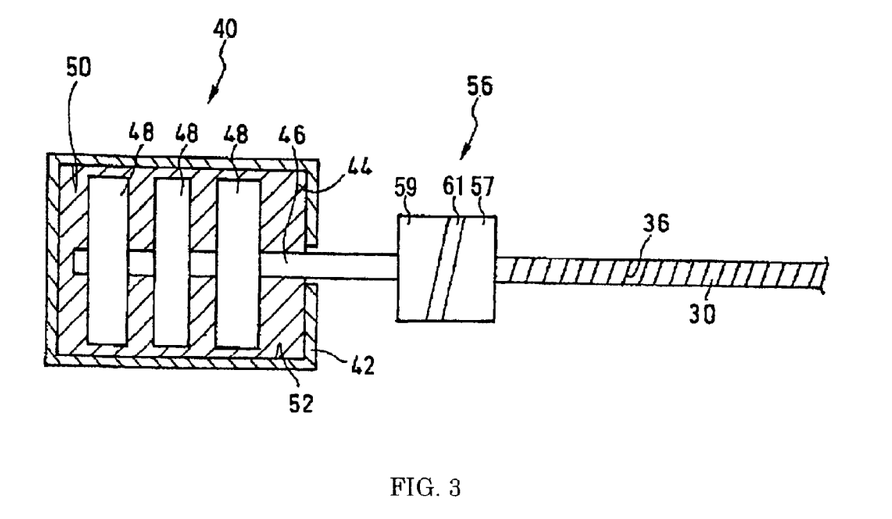
FIG. 3 is a partially cross-sectional view of the damping device shown in FIG. 1.

As shown in FIG. 3, the rotating object vibration damper 40 includes a case 42, an electroviscous fluid 44, a rotation shaft 46 for vibration damping, and cylindrical rings 48.

The case 42 is filled with the electroviscous fluid 44. One end of the vibration damping rotation shaft 46 is connected to the end of the driving rotation shaft 30. On a part of the other end of the vibration damping rotation shaft 46, a plurality of cylindrical rings 48 are provided. The cylindrical rings 48 are rotatably provided in the case 42 which is filled with the electroviscous fluid 44. In addition, electrodes 50 and 52 are provided in the case 42.

An appropriate voltage is applied from a voltage applicator to the electrodes 50 and 52 in response to the instruction from the controller, whereby the viscosity of the electroviscous fluid 44 filled into the case 42 is controlled.

In this embodiment, when the cylindrical rings 48 provided in the vibration damping rotation shaft 46 rotate as the driving rotation shaft 30 rotates, the movement of the electroviscous fluid 44 occurs. The dissipation of energy proportional to the viscosity of the electroviscous fluid 44 is generated by the velocity of flow following this movement of the electroviscous fluid 44, thereby exhibiting a vibration damping effect.

In this embodiment, therefore, if the voltage applicator changes the voltage applied to the electroviscous fluid 44 in response to the instruction from the controller, the viscosity of the electroviscous fluid 44 changes and it is thereby possible to obtain an optimum vibration damping effect.

According to the three-dimensional coordinate measuring machine (CMM), for example, the voltage applicator sets a voltage applied to the electroviscous fluid 44 at zero during the high speed movement in response to the instruction from the controller, thereby lowering the viscosity of the electroviscous fluid 44.

On the other hand, during the low speed movement (such as the point-to-point measurement or the scanning measurement), the voltage applicator increases the voltage applied to the electroviscous fluid 44 in response to the instruction from the controller, thereby increasing the viscosity of the electroviscous fluid 44.

As can be seen, in this embodiment, the controller can actively control the viscosity of the electroviscous fluid 44, so that smooth sliding guide is realized. In this embodiment, the residual vibration is suppressed during the high speed movement and the micro-vibration is damped during the low speed movement, for example, thereby reducing errors resulting from the vibrations.

Furthermore, in this embodiment, the electroviscous fluid 44 is used and the viscosity thereof can be made variable, thereby making it possible to use the feeding device in a wide range of applications from the high speed movement to the low speed movement.

Further, in this embodiment, a vibration during the movement of the three-dimensional coordinate measuring machine or the like can be suppressed and a micro-vibration during the measurement can be damped, so that precision variations due to the vibrations of the three-dimensional coordinate measuring machine can be improved.

In addition, the damping device in this embodiment is applicable to a general-purpose three-dimensional coordinate measuring machine or the like and greatly advantageous in acceleration and high precision.

Moreover, in this embodiment, as shown in FIG. 3, the damping rotation shaft 46 of the damping device 40 is attached to the end of the driving rotation shaft 30 of the three-dimensional coordinate measuring machine through a coupling (joint) 56.

For the coupling 56, a metal spring type coupling, for example, is more suitable than the other couplings if the damping device is used for the CMM shown in this embodiment. The coupling 56 includes, for example, a driving side connection section 57, a damping side connection section 59 and an intervening section 61.

The driving side connection section 57 is made of a material having high torsional rigidity and provided on the end of the driving rotation shaft 30.

The damping side connection section 59 is made of a material having high torsional rigidity as in the case of the driving side connection section 57 and provided on the end of the damping rotation shaft 46 of the vibration damper 40.

The intervening section 61 is made of a material which hardly deteriorates the torsional rigidity of the coupling 56 and which is flexible to such an extent as to be appropriately capable of absorbing the misalignment between the rotation shafts 30 and 46. The intervening section 61 is made of, for example, a metal plate spring. The intervening section 61 is provided on the connection between the driving side connection section 57 and the damping side connection section 59.

As stated above, the coupling 56 has high torsional rigidity in this embodiment. As a result, even if the CMM in which the supporting column moved relative to the base has a weight as heavy as, for example, several hundreds kilograms is employed, the driving force of the driving rotation shaft 30 can be surely transmitted to the damping rotation shaft 46 through the coupling 56. Furthermore, in this embodiment, even if the supporting column and the probe are moved relative to the base at high speed, the driving force of the driving rotation shaft 30 can be surely transmitted to the damping rotation shaft 46 through the coupling 56. It is, therefore, possible to appropriately control the high speed movements of the supporting column and the probe.

Moreover, in this embodiment, most of the vibrations of the driving rotation shaft 30 are transmitted to the damping rotation shaft of the vibration damper 40 through the coupling 56. It is thereby possible for the vibration damper 40 to ensure the good damping of the vibrations occurred in the driving rotation shaft 30.

Besides, in this embodiment, the intervening section 61 of the coupling 56 is made of the metal plate spring which hardly deteriorates the high torsional rigidity of the coupling 56 and deflects flexibly enough for to such an extent that the misalignment between the rotation shafts 30 and 40 to be appropriately absorbed. Due to this, the coupling 56 can damp a part of the vibrations from the driving rotation shaft 30 while hardly deteriorating the high torsional rigidity of the coupling 56. It is extremely difficult for an ordinary coupling which is not provided with a flexible member such as the intervening section 61 or a coupling which is provided with a flexible member made of rubber resin to do such damping.

Furthermore, in this embodiment, the intervening section 61 made of the metal plate spring as stated above can appropriately absorb the misalignment between the driving rotation shaft 30 and the damping rotation shaft 46. This can greatly reduce the occurrence of vibrations caused by the misalignment between the rotation shaft 30 and 46.

In this embodiment, it is particularly suitable to employ, as the coupling 56, the metal plate spring type coupling in which the intervening section 61 is made of a metal plate spring because it is high in torsional rigidity and capable of appropriately absorbing the misalignment between the rotation shafts. Furthermore, the metal spring type coupling, such as a metal coil spring type coupling made of a metal coil spring as the intervening section 61 is as suitable to use for the CMM in this embodiment, for example, as the metal plate spring type coupling.

The control mechanism of the damping device in this embodiment will be concretely described next.

Figure 4:
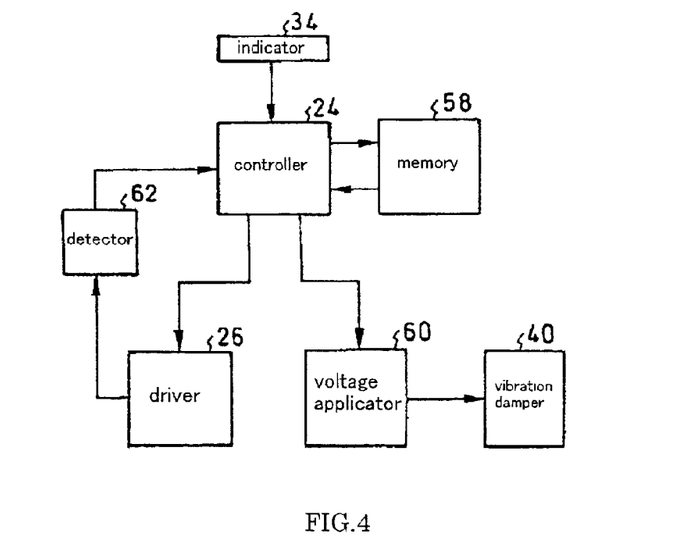
FIG. 4 is a block diagram showing the schematic configuration of the damping device shown in FIG. 1.

As already described above, the damping device in this embodiment includes the vibration damper 40 provided on the end of the driving rotation shaft 30, the indicator 34, a rotating object damping memory 58, a rotating object damping voltage applicator 60 and a rotating object damping controller 24 as shown in FIG. 4.

The indicator 34 indicates the rotating speed of the driving rotation shaft 30 (rotating object).

The rotating object damping memory 58 stores rotating object damping control information representing the relationship between the rotating speed of the driving rotation shaft 30 and an appropriate applied voltage at which the electroviscous fluid has a viscosity for absorbing most effectively the vibrations of the driving rotation shaft 30 at that speed, acquired in advance, for each expected speed of the driving rotation shaft 30.

The rotating object damping voltage applicator 60 applies a voltage to the electroviscous fluid filled into the rotating object vibration damper 40.

When the indicator 34 indicates the rotating speed of the driving rotation shaft 30, the controller 24 issues an instruction to the driver 26 to rotate the rotating object at the indicated speed and controls the operation of the rotating object damping voltage applicator 60 in accordance with the indicated speed.

That is, the controller 24 selects an optimum voltage applied to the electroviscous fluid to correspond to the indicated speed from the rotating object damping control information stored in the rotating object damping memory 58 to control the rotating object damping voltage applicator 60. By applying the selected voltage to the electroviscous fluid into the rotating object vibration damper 40, the controller 24 controls the operation of the rotating object damping voltage applicator 60.

The controller 24 selects, for example, a voltage to be applied at which the viscosity of the electroviscous fluid into the vibration damper 40 becomes lower as the indicated rotating speed value of the driving rotation shaft 30 indicated from the indicator 34 becomes higher, from the rotating object damping control information in the memory 58.

On the other hand, the controller 24 selects a voltage to be applied at which the viscosity of the electroviscous fluid in the vibration damper 40 becomes higher as the indicated rotating speed value of the driving rotation shaft 30 indicated from the indicator 34 becomes lower, from the rotating object damping control information in the memory 58.

The relationship between the viscosity level of the electroviscous fluid in the vibration damper 40 and the damping level obtained by the viscosity level in this embodiment is shown in Table 1 below. In this embodiment, low speed and high speed operations are carried out in each of, for example, the point-to-point measurement and scanning measurement. To control the damping operation during each operation, control methods shown in Table 2 below can be adopted by way of example.

TABLE 1

| Viscosity level | low | medium | high |
|---|---|---|---|
| Damping level | low | medium | high |

TABLE 2

| Operation status | Main purpose of controlling driving rotation shaft | Viscosity level |
|---|---|---|
| (1) Point-to-point Measurement | | |
| ① Case in which the distance between measurement points is relatively long: | | |
| 1. highest speed movement between measurement points | To lower inertia around driving rotation shaft and to improve driving transmission characteristic | low |
| 2. during deceleration and measurement | To improve damping effect | high |
| ② Case in which the distance between measurement points is relatively short: | | |
| 3. medium speed movement between measurement points | To lower inertia around driving rotation shaft and to improve driving transmission characteristic | Low |

TABLE 2-continued

| Operation status | Main purpose of controlling driving rotation shaft | Viscosity level |
|---|---|---|
| 4. during deceleration and measurement | To improve damping effect | High |
| During the deceleration and measurement in the items 2 and 4, damping according to the frequency of vibration may be performed so as to decrease a residual vibration during the high speed movement more effectively. | | |
| (2) Scanning measurement (e.g., profiling measurement) | | |
| 5. highest speed scanning measurement (high speed profiling measurement) | To improve damping effect of damping vibration following high speed profiling | medium |
| 6. low speed scanning measurement (low speed profiling measurement) | To improve damping effect of damping vibration following low speed profiling | high |

The controller 24 controls the operation of the voltage applicator 60 so that the voltage obtained in accordance with the indicated value of the rotating speed of the driving rotation shaft 30, can be applied to the electroviscous fluid.

According to the present invention, the damping device also includes a detector 62.

The detector 62 detects the rotating speed of the driving rotation shaft 30 at real time.

In addition, the controller 24 can conduct active control. That is, the controller 24 selects a voltage applied to the electroviscous fluid in accordance with each speed obtained by the detector 62 from the control information stored in the memory 58. The controller 24 controls the operation of the voltage applicator 60 so that the selected voltage can be applied to the electroviscous fluid. The controller 24 can thereby conduct more precisely active control according to an initial setting voltage based on the indicated speed value.

In case of the three-dimensional coordinate measuring machine (CMM), for example, the controller 24 sets the voltage applied to the electroviscous fluid at zero during high speed movement and sets the viscosity of the electroviscous fluid to be low. On the other hand, the controller 24 sets the voltage applied to the electroviscous fluid to be high during the low speed movement (e.g., point-to-point measurement or scanning measurement) and sets the viscosity of the electroviscous fluid to be high. In this way, the controller 24 actively controls the viscosity of the electroviscous fluid.

As explained above, in the damping device according to this embodiment, the vibration damper which uses the electroviscous fluid is provided on the end portion of the driving rotation shaft of the prevision machine such as the three-dimensional coordinate measuring machine and an optimum voltage according to the rotating speed of the driving rotation shaft is thereby applied to the electroviscous fluid.

As a result, according to this embodiment, it is possible not only to reduce the vibrations of the rotation axis itself but also to sufficiently transmit a driving force. In addition, by controlling the voltage applied to the electroviscous fluid in accordance with each speed, it is possible to conduct optimum damping to the rotating object in accordance with varied speeds. Besides, since the occurrence of vibrations on the supporting column itself caused by the vibrations on the rotating object is decreased, it is possible to realize smoothly sliding guide by means of the feeding device.

Consequently, according to this embodiment, it is possible to suppress a residual vibration during the high speed movement, to damp a micro-vibration during the low speed movement and to highly precisely rotate the rotating object. As a result, it is possible to decrease errors derived from the vibrations and to, therefore, attain the first object of the present invention.

Moreover, according to this embodiment, the damping control information on each expected rotating speed of the driving rotation shaft is stored in the memory in advance. In addition, by obtaining speed information on the driving rotation shaft, the controller accesses the control information in the memory and selects optimum control information in accordance with each speed. The controller controls the electroviscous fluid based on the selected control information.

For example, in this embodiment, before moving the movable object or the like, vibrations occurred on the movable object in accordance with an indicated speed is assumed and a voltage applied to the electroviscous fluid is set in advance. Namely, while the movable object is conventionally controlled after vibrations are occurred on the movable object, the vibrations on the movable object are assumed in advance before the movement of the movable object in accordance with the indicated speed value and then the electroviscous fluid is controlled according to the present invention.

For this reason, compared with a case in which the movable object is controlled after vibrations occur, it is possible to reduce the occurrence of vibrations by assuming the vibrations in advance and then controlling the electroviscous fluid. According to this embodiment, therefore, it is possible to highly precisely control damping. Besides, compared with a case in which control information is not obtained in the memory in advance, it is possible to promptly conduct control and to thereby realize the second object of the present invention.

In addition, while it is normally considered that control of the rotating speed of the driving rotation shaft by the motor which causes the occurrence of vibrations and the damping control by the damping device are conducted separately, these controls are associated with each other according to the present invention.

In other words, in this embodiment, when speed is indicated from the indicator, the operation of the stepping motor is controlled at the indicated speed and the application of the voltage to the vibration damper is controlled. Therefore, according to this embodiment, it is possible to conduct highly precise damping control compared with a case in which the controlling the rotating speed of the driving rotation shaft and the damping control by the damping device are conducted separately. As a result, it is possible to attain the first object of the present invention. Besides, since speedy control is realized in this embodiment, it is possible to attain the second object of the present invention.

According to this embodiment, in particular, the controller sets the viscosity of the electroviscous fluid to be low to thereby reduce load imposed on the rotation shaft during the high speed movement. During the slight movement, by contrast, the controller sets the viscosity of the electroviscous fluid to be high to conduct high damping. As can be seen, according to this embodiment, the viscosity of the electroviscous fluid is variably controlled between the high speed movement and the slight movement. As a result, this embodiment can attain the two objectives, i.e., to suppress a residual vibration during the high speed movement and to damp a vibration during the slight movement, thereby making it possible to successfully attain the first object of the present invention.

Furthermore, according to this embodiment, the detector detects the rotating speed of the driving rotation shaft at real time and the controller actively controls the operation of the voltage applicator based on the speed detected by the detector.

As a result, it is possible to conduct more precise, active control according to the initial setting voltage based on the indicated speed value. In this embodiment, for example, during the movement of the supporting column, the electroviscous fluid is controlled actively and more precisely according to the initial setting value based on the indicated speed value, making it possible to conduct more precise damping control. As a result, it is possible to attain the first object of the present invention.

Moreover, according to this embodiment, the coupling which connects the damping rotation shaft to the driving rotation shaft is provided. Due to this, it is possible to surely transmit the rotating force of the driving rotation shaft to the damping rotation shaft by the coupling. Besides, the coupling can absorb the misalignment between the driving rotation shaft and the damping rotation shaft. According to this embodiment, therefore, it is possible to transmit the rotation of the rotating object with high precision and to greatly reduce the vibrations of the rotation axis, thereby making it possible to attain the first object of the present invention.

Second Embodiment

The second embodiment of the present invention will be described hereinafter with reference to the drawings. This embodiment assumes a case in which a vibration damper is provided on the driving coupling section of a three-dimensional coordinate measuring machine and vibrations on the driving coupling section are damped. Sections corresponding to those in the first embodiment are denoted by the reference numbers of those in the first embodiment plus 100 and will not be described herein.

Figure 5:
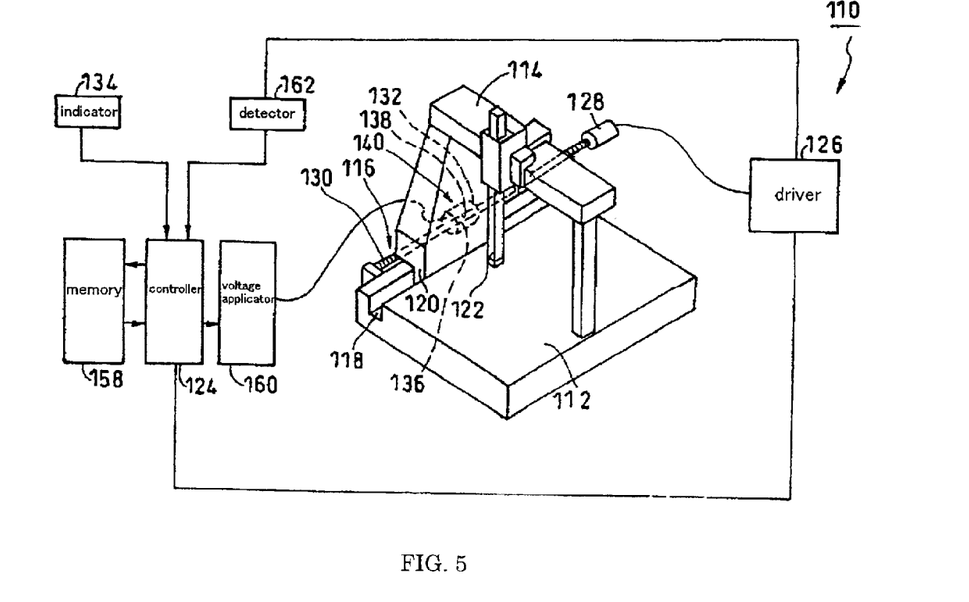
FIG. 5 is an explanatory view for the schematic configuration of a three-dimensional coordinate measuring machine which is provided with a damping device according to the second embodiment of the present invention.

As shown in FIG. 5, this embodiment assumes a case in which a damping device is provided on a nut 132 which constitutes the ball screw of the three-dimensional coordinate measuring machine, a supporting column 114 which is a linear movable object is provided through the damping device and vibrations on the supporting column 114 are damped.

Figure 6:
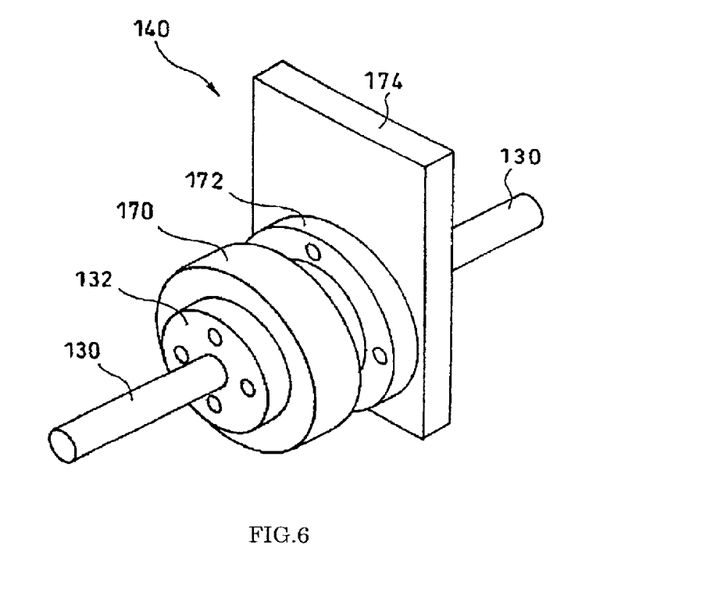
FIG. 6 is an outside perspective view of the damping device shown in FIG. 5.
Figure 7:
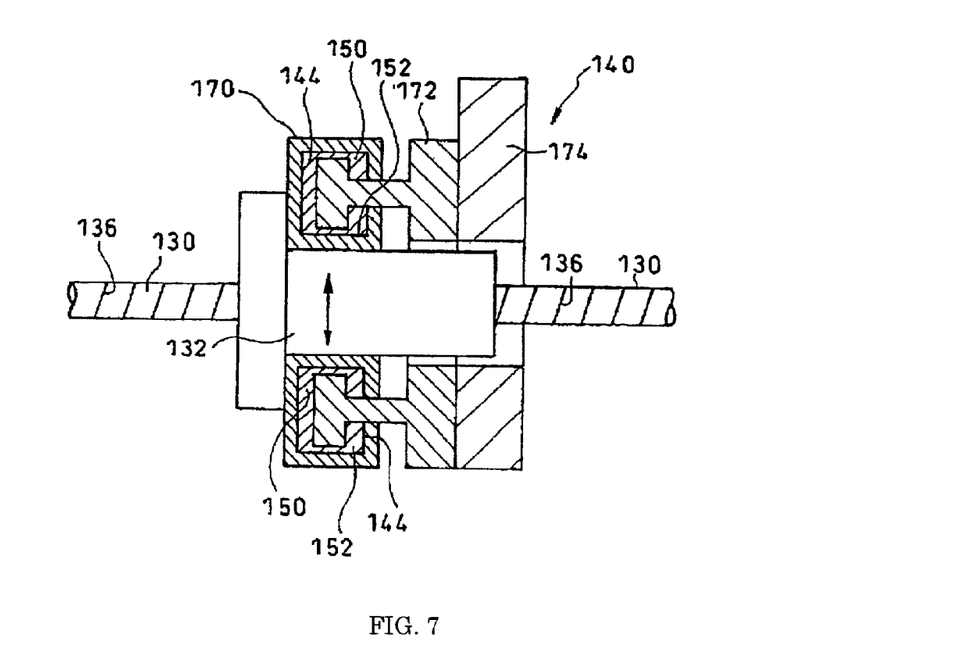
FIG. 7 is a partially cross-sectional view of the damping device shown in FIG. 5.

FIG. 6 is a schematic perspective view of a movable object vibration damper 140 according to this embodiment and FIG. 7 is a partially cross-sectional view of the vibration damper 140.

In this embodiment, the movable object vibration damper 140 includes the nut (linear movable object) 132, a frame 170, a flywheel 172, and a linear movable object attachment plate 174.

The nut 132 is provided with a female thread (not shown) which is fitted into the male thread 136 of a driving rotation shaft 130 on an inner periphery thereof. The frame 170 is fixed to the outer periphery of the nut 132 and the frame 170 is filled with an electroviscous fluid 144.

A part of the flywheel 172 is movably fastened through the electroviscous fluid 144 in the frame 170. The movable object attachment plate 174 is fixed to the flywheel 172 and attached to the supporting column of the three-dimensional coordinate measuring machine.

In this embodiment, a movable object damping controller sets a voltage applied to the electroviscous fluid 144 in the frame 170 to be high during the high-speed movement of the supporting column and sets the viscosity of the electroviscous fluid 144 to be high, thereby improving the driving transmission characteristic of the nut 132. The controller sets a voltage applied to the electroviscous fluid 144 so as to obtain optimum damping for the supporting column during the low speed movement of the supporting column (e.g., point-to-point measurement or scanning measurement).

As a result, the ball screw is deflected by its own weight to make a conical motion vertically and horizontally. In this embodiment, the escape of the ball screw is absorbed by the electroviscous fluid 144 in the frame 170.

In addition, the controller actively controls the viscosity of the electroviscous fluid 144, thereby realizing smooth sliding guide. For example, the controller suppresses a residual vibration during the high speed movement and, at the same time, damps a micro-vibration during the low speed movement, thereby making it possible to reduce errors derived from the vibrations.

Furthermore, when the ball screw rotates, the ball rotation of the nut occurs and a micro-vibration is occurred. In this embodiment, even the micro-vibration can be damped by the electroviscous fluid 144 in the frame 170.

Figure 8:
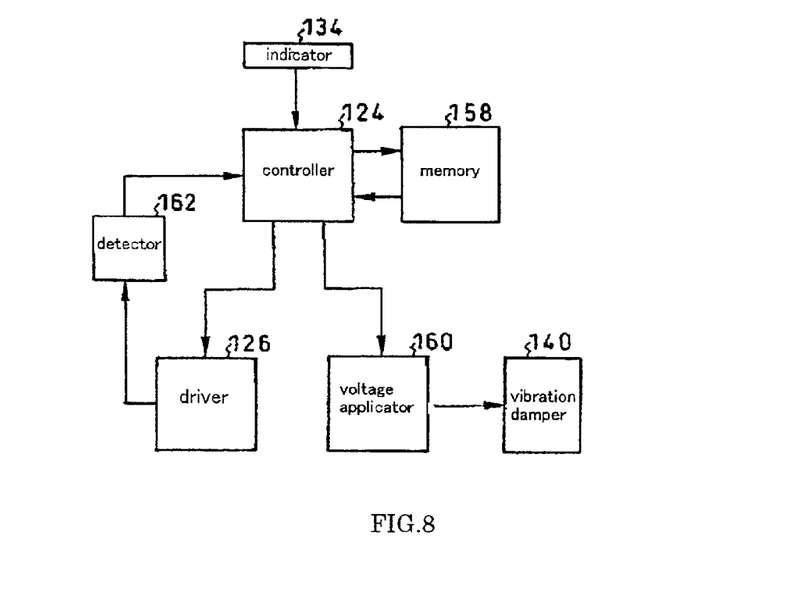
FIG. 8 is a block diagram showing the schematic configuration of the damping device shown in FIG. 5.

Referring to FIG. 8, the control mechanism of the vibration damper according to this embodiment will next be described more concretely.

In this embodiment, a movable object damping memory 158 stores control information including the relationship obtained in advance between the moving speeds of the nut and the supporting column and an optimum voltage applied to the electroviscous fluid so as to obtain the viscosity of the electroviscous fluid which can absorb most effectively vibrations occurred on the nut and the supporting column at each moving speed.

The movable object damping controller 124 selects a voltage to be applied to the electroviscous fluid so that the viscosity of the electroviscous fluid becomes higher as the indicated value of the moving speed of the nut (supporting column) to a driver 126 or a motor from an indicator 134 becomes higher, from the control information in the memory 158.

On the other hand, the movable object damping controller 124 selects a voltage to be applied to the electroviscous fluid so that the viscosity of the electroviscous fluid becomes lower as the indicated value of the moving speed of the nut (supporting column) to the driver 126 or the motor from the indicator 134 becomes lower, from the control information in the memory 158.

The controller 124 controls the movable object vibration damper 140 according to the control information selected from the information in the memory 158.

The relationship between the viscosity level of the electroviscous fluid on the driving coupling section and the damping level obtained by the viscosity level in this embodiment is shown in Table 3 below. In this embodiment, low speed and high speed operations are carried out in each of, for example, the point-to-point measurement and scanning measurement. To control the damping operation during each operation, control methods shown in Table 4 below can be adopted as an example.

TABLE 3

| Viscosity level | low | medium | high |
| --- | --- | --- | --- |
| Damping level | high | medium | low |

TABLE 4

| Operation status | Main purpose of controlling driving coupling section | Viscosity level |
| --- | --- | --- |
| (1) Point-to-point Measurement | | |
| ① Case in which the distance between measurement points is relatively long: | | |
| 1. highest speed movement between measurement points | To improve transmission characteristic of driving coupling section | high |
| 2. during deceleration and measurement | To improve damping effect | low |
| ② Case in which the distance between measurement points is relatively short: | | |
| 3. medium speed movement between measurement points | To improve transmission characteristic of driving coupling section | high |
| 4. during deceleration and measurement | To improve damping effect | low |

TABLE 4-continued

| Operation status | Main purpose of controlling driving coupling section | Viscosity level |
| --- | --- | --- |
| During the deceleration and measurement in the items 2 and 4, damping according to the frequency of vibration may be performed so as to decrease a residual vibration during the high speed movement more effectively. | | |
| (2) Scanning measurement (e.g., profiling measurement) | | |
| 5. highest speed scanning measurement (high speed profiling measurement) | To improve damping effect of damping vibration following high speed profiling | medium |
| 6. low speed scanning measurement (low speed profiling measurement) | To improve damping effect of damping vibration following low speed profiling | low |

The controller 124 controls the operation of a movable object damping voltage applicator 160 so that the voltage obtained in accordance with the indicated values of the moving speeds of the nut 132 or the supporting column, can be applied to the electroviscous fluid.

In this embodiment, for example, the movable object damping controller 124 sets a voltage applied to the electroviscous fluid to be high and sets the viscosity of the electroviscous fluid to be high during the high speed movement, thereby improving the driving characteristic.

On the other hand, the movable object damping controller 124 sets a voltage applied to the electroviscous fluid so as to obtain the optimum damping characteristic during the low speed movement (e.g., point-to-point measurement or scanning measurement).

As a result, the ball screw makes a conical motion vertically and horizontally because the ball screw is made flex by its own weight. In this embodiment, the escape of the ball screw can be absorbed by the electroviscous fluid in the nut.

Here, in this embodiment, the viscosity of the electroviscous fluid is actively controlled, thereby realizing smooth sliding guide. For example, a residual vibration during the high speed movement can be suppressed and a micro-vibration during the low speed movement can be damped, so that errors derived from the vibrations can be reduced.

Besides, in this embodiment, a detector 162 which detects the moving speeds of the nut and supporting column at real time is provided. Due to this, the controller 124 selects a voltage to be applied in accordance with the speed detected by the detector from the control information in the memory 158. The controller 124 actively controls the operation of the voltage applicator according to the selected voltage. Namely, the controller 124 can conduct more precise, active control according to an initial setting voltage based on, for example, the indicated value of the indicator 134.

As stated above, in this embodiment, the movable object vibration damper 140 is provided on the nut, the supporting column is provided on the vibration damper 140 and vibrations are damped in accordance with the moving speeds of the nut and the supporting column.

Due to this, in this embodiment, it is possible to greatly decrease the propagation of the vibrations from the driving rotation shaft 130 or those of the nut to the supporting column. In addition, in this embodiment, since it is possible to sufficiently transmit a driving force, the supporting column can be fed and moved with high precision.

Further, in this embodiment, by controlling the electroviscous fluid according to the moving speed of the linear movable object such as the nut or the supporting column, vibrations occurred on the linear movable object such as the nut or the supporting column can be optimally damped in accordance with varied speeds. As a result, in this embodiment, it is possible to feed and move the movable object with high precision and to greatly reduce vibrations transmitted to the movable object, so that the first object of the present invention can be attained.

Further, in this embodiment as in the case of the first embodiment, the control information on each expected speed of the movable object is stored in the memory in advance. The controller accesses the control information in the memory and selects optimum control information according to the moving speed of the movable object. The controller controls the electroviscous fluid in accordance with the selected control information.

Due to this, in this embodiment, compared with a case in which the movable object is controlled after vibrations occur, it is possible to reduce the generation of vibrations by assuming the vibrations in advance and then controlling the electroviscous fluid. According to this embodiment, therefore, it is possible to highly precisely control damping. Besides, compared with a case in which control information is not obtained in the memory in advance, it is possible to promptly conduct control and to thereby attain the second object of the present invention.

Further, according to this embodiment, the detector detects the moving speed of the movable object at real time and the controller actively controls the voltage applicator based on the speed detected by the detector. In this embodiment, for example, as in the case of the first embodiment, the electroviscous fluid is controlled more precisely and actively according to the initial setting value based on the indicated speed value. As a result, according to this embodiment, it is possible to control the damping of the vibrations on the movable object more precisely and to thereby sufficiently attain the first object of the present invention.

Moreover, according to this embodiment as in the case of the first embodiment, the speed control is associated with the damping control by the damping device. Due to this, compared with a case in which these controls are separately conducted, it is possible to conduct high accuracy damping control. As a result, according to this embodiment, the first object of the present invention can be sufficiently attained. Besides, because of such association of controls, speedy control can be conducted and the second object of the present invention can be sufficiently attained.

It is noted that the damping device of the present invention is not limited to the respective configurations described above but various changes and modifications within the scope of the invention can be made.

For example, the controller may conduct damping control at real time in accordance with the indicated speed or the speed detected by the detector even when the driving rotation shaft is accelerated or decelerated. Alternatively, the controller may control a viscosity control cycle according to the speed instead of controlling the viscosity to be constant according to the speed.

Furthermore, the damping control information can be obtained by setting a vibration meter on, for example, the tip of the supporting column of the three-dimensional coordinate measuring machine or the tip of a Z-axis spindle and a value can be acquired so that vibrations become a minimum for each driving speed and control information can be thereby obtained. Alternatively, the damping control information can be obtained by stopping the three-dimensional coordinate measuring machine for positioning a number of times and thereby acquiring a value at which a variation in positioning precision becomes a minimum.

Furthermore, in the respective configurations in the embodiments, an example of separately providing the rotating object vibration damper and the movable object vibration damper has been described. The both dampers can be combined. By doing so, compared with a case in which the respective vibration dampers are provided solely, a high damping effect can be obtained. Besides, more prompt damping control can be ensured.

Further, in the embodiments, an arbitrary motor such as a DC motor, an AC motor or an ultrasonic motor can be used as the motor. However, to associate the rotation control of the driving rotation shaft with the damping control by the damping device, a pulse motor such as the stepping motor described above is more preferable.

Additionally, in the respective configurations of the embodiments, an example of employing the damping device of the present invention in the three-dimensional coordinate measuring machine has been described. However, the present invention is not limited thereto. Needless to say, the damping device of the present invention can be applied to not only the other machine which, for example, perform a low speed operation and a high speed operation, e.g., a measuring machine other than the three-dimensional coordinate measuring machine, but also an ordinary machine such as a robot.

We claim:

1. A damping device used in a machine comprising a movable object and a motor moving said movable object, the damping device comprising:
   a vibration damper filled with an electroviscous fluid having a viscosity changing according to a value of a voltage applied to the electroviscous fluid, and movably supporting at least a part of said movable object in the electroviscous fluid;
   a voltage applicator applying the voltage to the electroviscous fluid in said vibration damper;
   a controller controlling an operation of said voltage applicator so that an optimum voltage, at which the viscosity of the electroviscous fluid absorbing a vibration of said movable object most effectively is obtained, can be applied to the electroviscous fluid in said vibration damper in accordance with a moving speed of said movable object;
   an indicator indicating the moving speed of said movable object; and
   a memory storing control information representing a relationship between the moving speed of said movable object and the optimum voltage applied to the electroviscous fluid at which the viscosity of the electroviscous fluid absorbing the vibration of the movable object most effectively at the moving speed, is obtained in advance, for each expected moving speed of the movable object, wherein:
       when said indicator indicates the moving speed of said movable object, said controller indicates said motor to move the movable object at the indicated moving speed, selects the optimum voltage applied to the electroviscous fluid to correspond to the indicated moving speed, and controls the operation of said voltage applicator so that the selected voltage can be applied to the electroviscous fluid in said vibration damper.

2. The damping device according to claim 1, further comprising a rotating object rotating about a rotation axis, wherein:
   the motor rotates said rotating object, which moves the movable object;
   the vibration damper rotatably supports at least a part of said rotating object in the electroviscous fluid; and the controller controls the operation of said voltage applicator so that the optimum voltage, at which the viscosity of the electroviscous fluid absorbing the vibration of said rotating object most effectively is obtained, can be applied to the electroviscous fluid in said vibration damper in accordance with the rotating speed of said rotating object.

3. The damping device according to claim 2, further comprising:
a rotating indicator indicating the rotating speed of said rotating object; and
the memory storing control information representing relationship between the rotating speed of said rotating object and the optimum voltage applied to the electroviscous fluid at which the viscosity of the electroviscous fluid absorbing the vibration of the rotating object most effectively at the rotating speed, obtained in advance, for each expected rotating speed of the rotating object, wherein
when said rotating indicator indicates the rotating speed of said rotating object, said controller indicates said motor to rotate the rotating object at the indicated rotating speed, selects the optimum voltage applied to the electroviscous fluid to correspond to the indicated rotating speed and controls the operation of said voltage applicator so that the selected voltage can be applied to the electroviscous fluid in said vibration damper.

4. The damping device according to claim 3, wherein
said controller selects, from the control information in said memory, the voltage applied to the electroviscous fluid at which the viscosity of the electroviscous fluid in said vibration damper becomes lower as an indicated value of the rotating speed of the rotating object indicated by said indicator is higher; and
said controller selects, from the control information in said memory, the voltage applied to the electroviscous fluid at which the viscosity, of the electroviscous fluid in said vibration damper becomes higher as the indicated value of the rotating speed of the rotating object indicated by said indicator is lower.

5. The damping device according to claim 3, comprising:
a detector detecting the rotating speed of said rotating object at real time, wherein
said controller selects the optimum voltage applied to the electroviscous fluid to correspond to the rotating speed detected by said detector from the control information in said memory, and actively controls the operation of said voltage applicator so that the selected voltage can be applied to the electroviscous fluid.

6. The damping device according to claim 5, wherein
said controller selects the voltage applied to the electroviscous fluid at which the viscosity of the electroviscous fluid in said vibration damper becomes lower as the speed value of the rotating object detected by said detector is higher;
said controller selects the voltage applied to the electroviscous fluid at which the viscosity of the electroviscous fluid in said vibration damper becomes higher as the speed value of the rotating object detected by said detector is lower; and
said controller actively controls the operation of said voltage applicator in accordance with the rotating speed detected by said detector.

7. The damping device according to claim 2, wherein
said rotating object comprises:
a damping rotation shaft supported in the electroviscous fluid in said vibration damper;
a driving rotation shaft transmitting a driving force from said motor; and
a coupling connecting said damping rotation shaft to said driving rotation shaft, wherein
a rotating force from said driving rotation shaft is surely transmitted to said damping rotation shaft through the coupling, and the coupling absorbs misalignment between the damping rotation shaft and the driving rotation shaft.

8. The damping device according to claim 1, further comprising:
a rotating object rotating about a rotation axis, wherein the motor rotates said rotating object; and
a driving coupling section transforming rotating motion of the rotating object into a linear motion, wherein:
the movable object is provided in the driving coupling section and making the linear motion,
the vibration damper is provided between the driving coupling section and the movable object, and
the movable object makes the linear motion in a state that the movable object is supported in the electroviscous fluid in the vibration damper.

9. A damping device according to claim 8, wherein
said controller selects, from the control information in said memory, the voltage applied to the electroviscous fluid at which the viscosity of the electroviscous fluid in said vibration damper becomes higher as an indicated value of the moving speed of the movable object indicated by said indicator is higher; and
said controller selects, from the control information in said memory, the voltage applied to the electroviscous fluid at which the viscosity of the electroviscous fluid in said vibration damper becomes lower as the indicated value of the moving speed of the movable object indicated by said indicator is lower.

10. A damping device according to claim 8, comprising:
a detector detecting the moving speed of said movable object at real time, wherein
said controller actively selects the optimum voltage applied to the electroviscous fluid to correspond to the moving speed detected by said detector from the control information in said memory, and controls the operation of said voltage applicator so that the selected voltage can be applied to the electroviscous fluid.

11. A damping device according to claim 10, wherein
said controller selects the voltage applied to the electroviscous fluid at which the viscosity of the electroviscous fluid in said vibration damper becomes higher as the speed value of the movable object detected by said detector is higher;
said controller selects the voltage applied to the electroviscous fluid at which the viscosity of the electroviscous fluid in said vibration damper becomes lower as the speed value of the movable object detected by said detector is lower; and
said controller actively controls the operation of said voltage applicator in accordance with the moving speed detected by said detector.

* * * * *